United States Patent [19]
O'Hara

[11] 3,909,450
[45] Sept. 30, 1975

[54] METHOD OF CATALYST MANUFACTURE
[75] Inventor: Mark J. O'Hara, Mt. Prospect, Ill.
[73] Assignee: Universal Oil Products Company, Des Plaines, Ill.
[22] Filed: Dec. 26, 1973
[21] Appl. No.: 428,280

[52] U.S. Cl. ............... 252/438; 208/112; 208/111; 208/216
[51] Int. Cl.² ........................................ B01J 27/24
[58] Field of Search .................................... 252/438

[56] References Cited
UNITED STATES PATENTS
3,377,295  4/1968   Pryor ............................ 252/438 X
3,630,889  12/1971  Arey et al. ..................... 252/438 X
3,778,365  12/1973  Hamner et al. .................. 252/438 X Primary Examiner—Patrick P. Garvin
Attorney, Agent, or Firm—James R. Hoatson, Jr.; Robert W. Welch; William H. Page, II

[57] ABSTRACT

An improved method of preparing a catalyst comprising a Group VIB and a Group VIII metal impregnated on a refractory inorganic oxide carrier material, said catalyst being particularly useful in the hydrorefining of residual oils. The carrier material is further impregnated with a nitrogen-containing organic compound, the compound being subsequently thermally decomposed to deposit nitrogen on the carrier material. The nitrogen-containing compound is characterized by a basic dissociation constant of less than about $1 \times 10^{-13}$ at 25° C.

7 Claims, No Drawings

METHOD OF CATALYST MANUFACTURE

This invention relates to a method of manufacturing a catalyst particularly adapted to the hydrorefining of residual oils. Residual oils are the liquid or semi-liquid products recovered as a non-distillable bottoms fraction or residue in the distillation of petroleum. The residual oils are highly carbonaceous refractory materials variously referred to as asphaltum oil, liquid asphalt, black oil, petroleum tailings, residuum, residual reduced crude, vacuum bottoms, and the like. In general, the hydrorefining or hydrotreating of residual oils is designed for the conversion of $C_7$-insoluble asphaltenes and other hydrocarbonaceous matter to more valuable distillable petroleum products, and/or the conversion and separation of sulfurous components to render the residual oil useful, for example as a fuel oil.

Catalysts comprising a metal of Groups VIB and VIII, preferably impregnated on an alumina or alumina-silica carrier material, have received art recognition for their capacity to convert $C_7$-insoluble asphaltenes as well as sulfurous compounds in residual oils at hydrorefining conditions. In general, Group VIB and Group VIII metal catalysts with a surface area of from about 120 to about 250 square meters per gram, an average pore diameter of from about 60 to about 120 angstroms, and an average pore volume of from about 0.3 to about 0.5 cubic centimeters per gram, are most effective for the hydrorefining of residual oils.

It is an object of this invention to present an improved method of preparing a hydrorefining catalyst comprising a Group VIB and a Group VIII metal impregnated on a refractory inorganic oxide material, said improvement resulting in increased activity of the catalyst with respect to hydrocracking, desulfurization, and conversion of $C_7$-insoluble asphaltenes contained in a residual oil feed stock. Thus, according to one embodiment of this invention, an improved method of manufacture comprises further impregnating a nitrogen-containing compound on said carrier material, and effecting thermal decomposition of said compound and adsorption of nitrogen on said carrier material, said nitrogen-containing compound being characterized by a basic dissociation constant of less than about $1 \times 10^{-13}$ at $25°$ C.

Other objects and embodiments of this invention will become apparent in the following detailed specification.

The refractory inorganic oxide component of the catalyst composite of this invention, while serving as a carrier for the other catalytic components, contributes to the overall activity and stability of the catalyst composite. Suitable refractory inorganic oxides include alumina, silica, zirconia, boria, thoria, etc., or combinations thereof, particularly alumina in combination with one or more refractory inorganic oxides. Alumina composited with silica in a weight ratio of from about 1.5:1 to about 9:1, preferably from about 3:1 to about 9:1, is a particularly suitable refractory inorganic oxide and the further description of the method of manufacture of this invention is presented with reference thereto.

Many methods are known for preparing the preferred alumina-silica composite. The simplest and most widely practiced methods involve either the precipitation of one of the components, alumina or silica, from a sol as a gel, said gel being thereafter impregnated with a solution of a suitable gel precursor of the other component which is thereafter precipitated to form an alumina-silica cogel, or alternatively, both components, alumina and silica, may be coprecipitated from a common sol. In the latter case, it is most convenient to prepare an acidic silica sol and an alumina sol and then commingle the sols in the desired proportion. Alumina-silica composites comprising alumina in at least an equimolar amount with silica are especially well prepared by this last described method.

Several alternative procedures are available for preparing an acidic silica sol. In one method, a suitable mineral acid such as hydrochloric acid, sulfuric acid, or nitric acid as added to an aqueous solution of an alkali metal silicate, sodium silicate being preferred because of its low cost and general availability. In the second method, the order of addition is reversed, the water glass being added to the acid. The latter technique is preferred since the formation of the silica sol always occurs under acid conditions and there is no danger of the sol prematurely solidyfying as is the case in the former method when the pH of the system is reduced from a high value to a low value. When using hydrochloric or sulfuric acid, concentrations thereof of from about 10% to about 30% are satisfactory. The water glass solution may be prepared from commercial sodium silicates, such as Philadelphia Quartz Company, brands E, M, N, or S. The commercial water glass is first diluted with water to reduce the silica concentration thereof to about 5-15 wt. %. The commingling of acid and water glass is preferably carried out with agitation and at a temperature below about $35°$ C. The pH of the acidic sol at this stage will be in the range of 1.5-2. If desired, the silica sol may be aged at this pH for a period of 0.1-1 hours or more.

While an alumina sol precursor, such as an aqueous solution of aluminum sulfate, aluminum chloride or aluminum nitrate may be commingled with the silica, it is preferable to employ a true alumina sol. One method of preparing an alumina sol is in the electrolysis of an aluminum salt solution, such as an aqueous aluminum chloride solution, in an electrolytic cell having a porous partition between the anode and cathode whereby an acid anion deficient aluminum salt solution, or sol, is recovered from the cathode compartment. Preferably, the alumina sol is an aluminum chloride sol prepared by treating an excess of aluminum particles in aqueous hydrochloric acid and/or aluminum chloride solution, usually at about reflux temperature, until a quantity of aluminum has been digested sufficient to form a sol of a predetermined aluminum/chloride ratio which influences the pore volume and pore diameter characteristics of the alumina-silica composite as hereinafter related.

The separately formulated silica and alumina sols are then blended to yield an acidic hydrosol of alumina and silica. The alumina sol may be added to the silica sol, or the silica sol may be added to the alumina sol or both may be continuously admixed with an in-line blender. The mixing should be done with agitation and with water addition, if necessary, to prevent premature gelation at this point, since the blended sol is undergoing some polymerization as viscosity increases.

A preferred method of preparing the alumina-silica component relates to the cogelation of an alumina sol and a silica sol to form spherical gel particles utilizing the well-known oil drop method. Thus, an alumina sol, suitably prepared by digesting aluminum pellets in aqueous hydrochloric acid solution, is commingled with a silica sol, suitably prepared by the acidification of water glass as is commonly practiced, and the sol blend dispersed as droplets in a hot oil bath whereby gelatin occurs with the formation of spheroidal particles. In this type of operation, the silica is set thermally, the alumina being set chemically utilizing ammonia as a neutralizing or setting agent. Usually the ammonia is furnished by an ammonia precursor which is included in the sol. The ammonia precursor is suitably urea, hexamethylenetetramine, or mixtures thereof, although other weakly basic materials which are substantially stable at normal temperatures but hydrolyzable to ammonia with increasing temperature may be employed. Only a fraction of the ammonia precursor is hydrolyzed or decomposed in a relatively short period during which initial gelation occurs. During the subsequent aging process, the residual ammonia precursor retained in the spheroidal gel particles continues to hydrolyze and effect further polymerization of the alimina-silica whereby the pore characteristics of the composite are established. The alumina-silica particles are aged, usually for a period of from about 10 to about 24 hours at a predetermined temperature, usually from about 50° to about 105° C., and at a predetermined pH value. The aging time is substantially reduced utilizing pressure aging techniques. With alumina-silica ratios in the higher range, pressure aging tends to lower the bulk density.

As previously stated, and as heretofore disclosed in the art, the foregoing method affords a convenient means of developing desired physical characteristics of the carrier material. Thus, one skilled in the art will appreciate that in general the aluminum/chloride ratio of the alumina sol will influence the average bulk density of the alumina-silica product and, correspondingly, the pore volume-pore diameter characteristics attendant therewith, lower ratios tending toward higher average bulk density. Other process variables effecting physical properties of the carrier material include the time, temperature and pH at which the particles are aged. Usually, temperatures in the lower range and shorter aging periods tend toward higher average bulk density.

In any case, the refractory inorganic oxide is dried and calcined prior to impregnation with the Group VIB and Group VIII metal components. Calcination is suitably accomplished by heating the carrier material in an oxygen-containing atmosphere, such as air, at a temperature increasing from about 125° to about 600° C. in a period of from about 30 minutes to about 90 minutes, and thereafter at a temperature of from about 600° to about 800° C. for at least about 30 minutes, and not necessarily in excess of about 8 hours.

It is the usual practice to deposit catalytically active metallic components on a support or carrier material by the method whereby a soluble compound of the desired metallic component is impregnated on the carrier material from an aqueous solution. The soluble compound serves as a precursor of the metallic component such that, upon subsequent heating of the impregnated carrier material at a temperature effecting decomposition of said compound, the desired metallic component is formed deposited on the carrier material. The hydrorefining catalyst of this invention is prepared to contain metallic components comprising a metal of Group VIB and Group VIII. Thus, the catalyst composite may comprise chromium, molybdenum and/or tungsten in combination with one or more metals of Group VIII, i.e., iron, nickel, cobalt, platinum, palladium, ruthenium, rhodium, osmium and iridium. The aqueous impregnating solution will thus comprise a soluble precursor compound of a Group VIB metal. Suitable compounds include ammonium molybdate, ammonium paramolybdate, molybdic acid, ammonium chromate, ammonium peroxychromate, chromium acetate, chromous chloride, chromium nitrate, ammonium metatungstate, tungstic acid, etc. The impregnating solution is suitably a common solution of a Group VIB metal compound and a Group VIII metal compound. Suitable soluble compounds of Group VIII metals include nickel nitrate, nickel sulfate, nickel chloride, nickel bromide, nickel fluoride, nickel iodide, nickel acetate, nickel formate, cobaltous nitrate, cobaltous sulfate, cobaltous fluoride, ferric fluoride, ferric bromide, ferric nitrate, ferric sulfate, ferric formate, ferric acetate, platinum fluoride, chloroplatinic acid, chloropalladic acid, palladium fluoride, etc. Of the Group VIB metals, molybdenum is preferred. The Group VIB metal is suitably employed in an amount to comprise from about 5 to about 20 wt. % of the final catalyst composite. The Group VIII metal, which is preferably nickel, is effective in an amount comprising from about 0.1 to about 10 wt. % of the final catalyst composite.

Impregnation of the carrier material can be accomplished by conventional techniques whereby the carrier material is soaked, dipped, suspended or otherwise immersed in the impregnating solution at conditions to adsorb a soluble compound comprising the desired catalytic component. Certain impregnating techniques have been found to be particularly favorable to promote the desired physical properties of the finished catalyst. Thus, impregnation of the Group VIB and Group VIII metal components is preferably from a common aqueous ammoniacal solution of soluble compounds thereof, for example, an ammoniacal solution of molybdic acid and nickel nitrate. Further, the impregnation is preferably effected utilizing a minimal volume of impregnating solution commensurate with an even distribution of the catalytic component on the carrier material. One preferred method involves the use of a steam jacketed rotary dryer. The carrier material is immersed in the impregnating solution contained in the dryer and the carrier material tumbled therein by the rotating motion of the dryer, the volume of the carrier material so treated being initially in the range of from about 0.7 to about 1.0 with respect to the volume of impregnating solution. Evaporation of the solution in contact with the carrier material is expedited by applying steam to the dryer jacket. The evaporation is further facilitated by a continuous purge of the dryer utilizing a flow of dry gas, suitably air or nitrogen.

The impregnated carrier material thus dried is thereafter calcined in an oxygen-containing atmosphere at a temperature of from about 425° to about 815° C. in accordance with prior art practice, usually for a period of from about 1 to about 8 hours or more.

Pursuant to the present invention, the carrier material is further impregnated with a nitrogen-containing organic compound. The nitrogen-containing compound may be impregnated on the carrier material from either an aqueous or an alcoholic solution thereof depending on the solubility characteristics of the selected nitrogen-containing compound. Preferably, although not necessarily, the nitrogen-containing compound is impregnated on the carrier material subsequent to the Group VIB and Group VIII metal components. The nitrogen-containing organic compounds for use herein are characterized by a basic dissociation constant of less than about $1 \times 10^{-13}$ at 25° C. Suitable nitrogen-containing compounds thus include such as acetamide, urea, thiourea, and the like. Certain of the arylamines are particularly useful nitrogen-containing compounds. It is well known that the basicity of arylamines, such as aniline, is markedly decreased by nuclear substitution, for example with one or more nitro groups, the extent of decreased basicity being dependent on the proximity of the substituent to the amino group. It is also well known that the basicity of arylamines, such as aniline, decreases with the further introduction of phenyl groups, especially where a nuclear carbon atom of the phenyl group is attached directly to the amino nitrogen. Thus, while aniline has a basic dissociation constant rated at $1 \times 10^{-13}$ at 25° C., diphenylamine, triphenylamine, o-nitroaniline, 2,4,6-trinitroaniline, and the like, are especially suitable for use in the present invention. In any case, the carrier material is further impregnated with sufficient of said nitrogen-containing compound to deposit from about 0.3 to about 0.6 wt. % nitrogen thereon.

Thus, one preferred embodiment of this invention relates to an improvement in the manufacture of a catalyst for the hydrorefining of residual oils, said catalyst comprising from about 5 to about 20 wt. % molybdenum and from about 0.1 to about 10 wt. % nickel impregnated on an alumina-silica carrier material, said improvement comprising the further impregnation of said carrier material with sufficient diphenylamine to deposit from about 0.3 to about 0.6 wt. % nitrogen thereon, decomposing said diphenylamine at a temperature of from about 350° to about 450° C., and forming nitrogen adsorbed on said carrier material.

The following example is presented in illustration of one embodiment of this invention and is not intended as an undue limitation on the generally broad scope of the invention as set out in the appended claims.

The activity of the catalyst prepared in accordance with the method of this invention was determined relative to the activity of a standard or reference catalyst. The relative activity of the catalyst was determined with respect to hydrocracking, desulfurization and heptane-insoluble asphaltenes conversion of a vacuum tower bottoms feed stock, all as a function of liquid hourly space velocity (LHSV), and to the quality of the bottoms remaining after vacuum Engler distillation of the liquid product. The vacuum tower bottoms feed stock had an API at 60° F. of 9.6, and contained 0.32 wt. % nitrogen, 3.25 wt. % sulfur and 4.7 wt. % heptane-insoluble asphaltenes. The feed stock further contained 10.52 wt. % hydrogen, and 73.5 wt. % was recovered as bottoms after vacuum Engler distillation.

In the relative activity test, 150 cubic centimeters of the catalyst to be evaluated is disposed in a ⅞ inch I.D. vertical tubular reactor as a fixed bed comprising alternating layers of 10 cubic centimeters of catalyst and 2 cubic centimeters of 60–80 mesh sand, the catalyst bed being preceded by a quartz chip preheat section. The reactor is pressured to 3000 psig with hydrogen, and the hydrogen is recycled over the catalyst at the rate of 15,000 SCF/BBL (based on a 1.0 LHSV hydrocarbon charge rate) while the catalyst inlet temperature is raised to 260° C. The vacuum tower bottoms feed stock is charged to the reactor at 1.0 LHSV for two hours after which the catalyst inlet temperature is raised at the rate of 30°/hr. to a temperature of 380° C. After a 27 hour line-out period, the liquid product effluent is collected over an 8 hour test period. The charge rate is thereafter reduced to 0.5 LHSV and, after an 8 hour line-out period, the liquid product effluent is again collected over an 8 hour test period. In each test period, the liquid product effluent is analyzed for heptane-insoluble asphaltenes and sulfur, and thereafter subjected to vacuum Engler distillation. The weight percent Engler bottoms is taken as a measure of hydrocracking activity.

The analytical results are in each case plotted on semi-logarithmic scales as a function of the LHSV employed. The slope of the resulting straight line is then utilized to determine the activity of the test catalyst relative to the standard or reference catalyst, the ratio of the slope from the test catalyst to that from the standard or reference catalyst (multiplied by a factor of 100) being the relative activity of the test catalyst.

The Engler bottoms are analyzed for sulfur, hydrogen, and API at 60° F. The ratio of the API to that of the reference catalyst Engler bottoms, the ratio of the percent hydrogen to that of the reference catalyst Engler bottoms, and the ratio of the percent sulfur of the reference catalyst Engler bottoms to that of the test catalyst Englers bottoms, each multiplied by a factor of 100, are averaged to determine the Engler bottoms rating. The relative activity of the catalyst is then taken as the average of the relative activity with respect to heptane-insoluble asphaltene conversion, relative activity with respect to desulfurization, relative activity with respect to hydrocracking, and the Engler bottoms rating. The relative activity of the catalyst is then an overall measure of catalyst activity. It will be appreciated that a test catalyst with a relative activity in excess of 100 is more active than the standard or reference catalyst.

The standard or reference catalyst employed herein consists of 2 wt. % nickel and 16 wt. % molybdenum on an alumina-silica carrier material comprising 88 wt. % alumina and 12 wt. % silica. In the preparation of the standard or reference catalyst, about 850 grams of an alumina sol, prepared by digesting 122 grams of aluminum in hydrochloric acid, was commingled with 7.1 cubic centimeters of concentrated hydrochloric acid to adjust the Al/Cl ratio to 1.3. The alumina sol was then admixed with 850 grams of an 18.4% aqueous hexamethylenetetramine solution sufficient to effect 180% neutralization of the free chloride in the sol upon total decomposition. The alumina sol was thereafter blended with a silica sol prepared by the acidification of 139 cubic centimeters of an aqueous water glass solution (18.5% $SiO_2$) with about 88 cubic centimeters of 50% hydrochloric acid, the Cl/Na ratio of the silica sol being 1.3. The sol blend was then dispersed as droplets in an oil bath at about 98° C. and formed into spherical gel particles. The spherical gel particles were aged in the hot oil bath for about 18 hours and thereafter for about 4 hours in a 3% aqueous ammonia solution at about 98° C. The spheres were then washed with about 19 liters of water containing 25 milliliters of a 28% aqueous ammonia solution and 15 milliliters of a 20% ammonium nitrate solution.

The alumina-silica spheres were dried in an oven at 125° C. until the volatile matter was reduced to about 26.5 wt. % as evidenced by weight loss upon ignition at 500° C. The dried spheres were charged to a muffle furnace at 125° C. and calcined in an air atmosphere at a temperature increasing from 125° to about 600° C. over a one-hour period. The spheres were then further calcined in the air atmosphere at 600° C. for about 1 hour. The calcined product had a surface area of about 323 m²/gm., an average pore diameter of about 78 angstroms and an average pore volume of about 0.63 cc/gm.

Impregnation of the spheres was effected by treating the spheres with an aqueous solution of molybdic acid and nickel nitrate in a rotary steam dryer. The aqueous solution was prepared by commingling an aqueous solution of 38.5 grams of 85% molybdic acid and 23 milliliters of ammonium hydroxide with an aqueous solution of 13.5 grams of nickel nitrate hexahydrate and 12 milliliters of ammonium hydroxide, the resulting solution being diluted to 170 milliliters with water. One hundred grams of the dried and calcined alumina-silica spheres were immersed in the impregnating solution which was then evaporated to dryness, with an additional hour of drying at 120° C. in a drying oven. The spheres were then dried in air at 400° C. for one hour and thereafter calcined in air at 595° C. for three hours.

In the impregnation of the carrier material with the Group VIB and Group VIII metal components and calcination of the final catalyst composite, the surface area and pore volume tend to decrease while the pore diameter tends to increase. Thus, upon impregnation and calcination, the reference catalyst composite had a surface area of 160 m²/gm, an average pore diameter of 100 angstroms, and an average pore volume of 0.4 cc/gm.

A catalyst substantially as described was further treated in accordance with the present invention. Thus, the catalyst was further immersed and soaked in a methanol solution containing 20 wt. % diphenylamine. The solution was evaporated to dryness in contact with the catalyst, and the catalyst was thereafter heated to 400° in a muffle furnace and heated at this temperature for 5 hours. The catalyst then contained 0.43 wt. % nitrogen. The surface area was essentially the same as the original catalyst. When evaluated pursuant to the described relative activity test, the catalyst had a relative activity of 118.

The relative activity test was extended both with respect to the reference catalyst and with respect to the test catalyst. After 163 hours on stream, the reference catalyst was found to require a temperature increase of 10° F. to maintain desulfurization and hydrocracking activity equivalent to that of the test catalyst.

I claim as my invention:

1. In the manufacture of a catalyst for the hydrorefining of residual oils, said catalyst consisting essentially of a Group VIB metal oxide and a Group VIII metal oxide impregnated on a refractory inorganic oxide carrier material, the improvement of further impregnating a nitrogen-containing organic compound on said carrier material to deposit from about 0.3 to about 0.6 wt. % nitrogen thereon, and effecting thermal decomposition of said compound and adsorption of nitrogen on said carrier material, said nitrogen-containing compound being characterized by a basic dissociation constant of less than about $1 \times 10^{-13}$ at 25°C.

2. The improvement of claim 1 further characterized in that said nitrogen-containing compound is an arylamine.

3. The improvement of claim 1 further characterized in that said nitrogen-containing compound is diphenylamine.

4. The improvement of claim 1 further characterized in that said refractory inorganic oxide is a composite of alumina and silica.

5. The improvement of claim 1 further characterized in that said refractory inorganic oxide is alumina composited with silica in a weight ratio of from about 3:1 to about 9:1.

6. The improvement of claim 1 further characterized in that said catalyst contains from about 5 to about 20 wt. % of Group VI B metal oxide and from about 0.1 to about 10 wt. % of Group VIII metal oxide.

7. The improvement of claim 1 further characterized in that said Group VIB metal oxide is molybdenum oxide and said Group VIII metal oxide is nickel oxide.

* * * * *